United States Patent Office 3,412,162
Patented Nov. 19, 1968

3,412,162
METHOD OF PREPARING PENTAFLUOROPHENYL MAGNESIUM CHLORIDE
William Kenneth Rodgerson Musgrave, Potters Bank, Durham City, England, assignor to Imperial Smelting Corporation (N.S.C.) Limited
No Drawing. Filed Feb. 28, 1964, Ser. No. 348,251
Claims priority, application Great Britain, Mar. 1, 1963, 8,250/63
2 Claims. (Cl. 260—665)

ABSTRACT OF THE DISCLOSURE

The invention relates to pentafluorophenyl magnesium chloride which is prepared by reacting chloropentafluorobenzene with finely divided magnesium in a dry ether in the presence of ethylene dibromide. The Grignard reagent obtained is used to prepare pentafluorobenzoic acid and methyl pentafluorophenyl mercury.

---

This invention relates to pentafluorophenyl compounds, i.e. compounds containing the $C_6F_5$-group.

The invention consists in a new Grignard reagent, pentafluorophenyl maguesium chloride.

The invention further consists in the above new Grignard reagent in solution in an ether, e,g, in diethyl ether or in tetrahydrofuran.

Certain pentafluorophenyl Grignard reagents, e.g. $C_6F_5MgBr$ and $C_5F_6MgI$ are already known. These can be prepared by methods analogous to those used for preparation of the phenyl Grignard reagents, starting from the compounds $C_6F_5Br$ and $C_6F_5I$ respectively.

These compounds, pentafluorobromobenzene and pentafluoroiodobenzene are relatively expensive and inaccessible compared to pentafluorochlorobenzene, which can now be prepared in good yield by treatment of $C^6Cl^6$ with an alkali metal fluoride. It is, of course well known that aryl chlorides are less reactive than aryl bromides or iodides in reactions involving the halogen atom. Chloropentafluorobenzene shows the same lack of reactivity compared with either brom- or iodo-pentafluorobenzene. For example we have found that chloropentafluorobenzene was recovered after being heated at 150° for 15 hours with cuprous cyanide in dimethylformamide. Under similar conditions bromo- or iodo-pentafluorobenzene gives a high yield of pentafluorobenzonitrile.

Again, when either bromo- or iodo-pentafluorobenzene is heated with copper bronze at 200° for about 40 hours decafluorobiphenyl is obtained in yields of about 90% whereas only a 3% yield of decafluorobiphenyl is obtained when chloropentafluorobenzene is heated with copper bronze at 200° for 64 hours.

Another example of this lack of reactivity of the chlorine atom in chloropentafluorobenzene is that it forms a Grignard reagent only with great difficulty and in poor yield under the "usual" conditions for Grignard formation. As a result, as will be described more fully below, certain standard methods which might have been expected to yield $C_6F_5MgCl$ from $C_6F_5Cl$ do not in fact do so, or even after lengthy reaction give only poor yields of contaminated product. This will be described in more detail below with reference to comparative examples.

It has now been discovered that if ethylene dibromide is added as an activator in the preparation of the new Grignard reagent good yields of $C_6F_5MgCl$ are obtained.

Accordingly, the invention primarily consists in a method of preparing pentafluorophenyl magnesium chloride in which chloropentafluorobenzene is reacted with magnesium in dry dialkyl ether (e.g. diethyl ether) or cyclic ether e.g. tetrahydrofuran and the reaction is activated by ethylene dibromide.

The magnesium may conveniently be used in the form of turnings or of particulate metal.

In a preferred method, the ethylene dibromide is added to magnesium turnings in dry ether, the mixture then being preferably heated to activate the magnesium, after which the chloropentafluorobenzene is added. To improve the yield, one or more further portions of dibromide may be added during the course of the reaction.

The invention will be further described with reference to the following examples:

EXAMPLE 1

This is a comparative example which illustrates the difficulty of forming a Grignard reagent from $C_6F_5Cl$.

The starting materials were chloropentafluorobenzene (2 g.) excess magnesium (reckoned on the basis of this amount of $C_6F_5Cl$) and ethyl bromide (0.66 g.).

The magnesium, in the form of turnings, was placed in an ethereal medium and activated with the ethyl bromide. The chloropentafluorobenzene was then added and the subsequent reaction was continued, with additions of the remainder of the ethyl bromide activator, for a total of 21 hours.

The complex of Grignard reagent formed was hydrolysed by adding water and acid and yielded pentafluorobenzene, the amount of this therefore being a measure of the extent of Grignard formation. 0.3 g. of $C_6F_5H$ were actually produced, indicating that the new Grignard had been formed in a yield of about 20%. The pentafluorobenzene was contaminated with 0.3 g. of unreacted chloropentafluorobenzene.

EXAMPLE 2

This is a further comparative example, using a different activator.

In this example 2.02 g. of $C_6F_5Cl$, 3.12 g. of ethyl iodide and excess magnesium were taken. After a procedure similar to that described in Example 1, 45% of $C_6F_5H$ were produced, but this was again contaminated, in this case with unchanged ethyl iodide activator, and could not be separated therefrom.

EXAMPLE 3

A further comparative example used 1.01 g. $C_6F_5Cl$, excess magnesium and 1.52 g. of ethyl iodide and proceeded as in Example 2. In this case 48% of the $C_6F_5H$ was produced again contaminated with $C_6F_5Cl$.

It would appear that when $C_2H_5Br$ or $C_2H_5I$ are used as activators the resulting solutions contain Grignard reagents derived from these. Accordingly, all subsequent reactions of the pentafluorophenyl Grignard reagent are complicated by products derived from $C_2H_5MgBr$ or $C_2H_5HgI$.

EXAMPLE 4

This is an example of the method according to the invention.

Ethylene dibromide (0.5 ml.) was added to magnesium turnings (1.50 g.) in dry diethyl ether (15 ml.). The reaction started on heating under reflux and further ethylene dibromide (0.5 ml.) was added after 15 minutes. Chloropentafluorobenzene (1.01 g.) was added after a further 10 minutes. Ethylene dibromide (0.5 ml.) was added after intervals of 20 and 50 minutes respectively, followed by more dibromide (0.15 ml.) after an interval of 80 minutes and the reaction was completed by 30 minutes refluxing.

It will be observed therefore that the whole reaction took two hours.

Water (3 ml.) was then added, followed by dilute sulphuric acid (3 ml.). The ethereal layer was distilled in vacuo and re-distilled in vacuo from phosphorus pentoxide. Analytical gas-chromatography showed only pentafluorobenzene in the ethereal solution and this could be separated from the ether by preparative scale gas-liquid chromatography. The pentafluorobenzene (0.56 g.) had an infra-red spectrum identical with that of an authentic specimen. The yield was about 65 to 70% and the product was pure.

It would appear that when ethylene dibromide is used to activate the magnesium, the Grignard reagent formed from it $BrCH_2$—$CH_2$—$MgBr$ decomposes to form $MgBr_2$ and $CH_2$=$CH_2$ and there is therefore no contamination.

Although ethylene dibromide is the preferred activator in work done to date, other activators may be possible provided that they give a reasonably short reaction time and a good yield of uncontaminated product. In particular, iodine has some usefulness as an activator.

The chloropentafluorobenzene used as a starting material may be made by any suitable method.

The Grignard reagent according to the invention is a relatively cheap and versatile new intermediate for preparing compounds containing the $C_6F_5$-group. Thus, olefins may be made from it, by reacting it with acetaldehyde and subsequent dehydration (giving pentafluorostyrene) or by treating it with acetone to give dimethyl (pentafluorophenyl) methanol and then dehydrating this. These olefins are polymerisable to give polystyrene-like products of improved heat- and oxidation-resistance.

Pentafluorobenzaldehyde may be made from the new intermediate by reacting it with N-methyl formanilide. Various acids may be made from this aldehyde (e.g. oxidation to pentafluorobenzoic acid or Knoevenagel reaction to pentafluorophenyl acrylic acid, or via the cyanhydrin to the mandelic acid) and the man skilled in the art will be aware how to perform these reactions. However, attempts to produce the pentafluorobenzoic acid

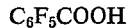
$C_6F_5COOH$ by $CO_2$ on the Grignard in diethyl ether will not work, and the following example of conversion into an acid is given, indicating that tetrahydrofuran should be used as the solvent in such a reaction.

EXAMPLE 5

Carbonation of pentafluorobenzoic acid

Pentafluorophenylmagnesium chloride was prepared as described above from chloropentafluorobenzene (1.01 g.) in ether (15 ml.). The Grignard solution was then distilled with dry tetrahydrofuran (100 ml.) until the total volume of the solution was 30 ml. Dry carbon dioxide was bubbled rapidly through the solution at room temperature for 1.5 hrs., dilute sulphuric acid was added, and the mixture extracted continuously with ether for 15 hrs. The extract was dried ($MgO_4$) and the solvent distilled to leave a solid, which was sublimed (120°/0.05 mm.), recrystallised from n-hexane, and re-sublimed. The pentafluorobenzoic acid (0.43 g., 41%), M.P. 102.5–103.5° (lit., 103–104°) had an infra-red spectrum identical with that of an authentic sample prepared from pentafluorophenylmagnesium bromide by the method of Harper and Tamborski (Chemistry and Industry, Oct. 20, 1962, p. 1824).

The pentafluorophenyl acrylic acid mentioned above is another polymer precursor to produce e.g. polyacrylate-like polymers. Moreover, these acids may be esterified to give liquid esters which are particularly heat-, oxidation- and nuclear radiation-stable and may be used as specialised heat-exchange fluids.

Moreover, from the acids, a whole range of substituted amides and basic ethers and esters may be made by methods well-known in the pharmaceutical art.

Finally, certain of the acids or at least of the acid halides prepared therefrom may be used in substrates for growing new penicillins. These acid halides have been used in the synthesis of pentafluorophenyl penicillins which have been found to have activity in vitro against such organisms are Staph. aureus, Staph. albus., S. subtilis, S. typhi, S. typhimurium, E. coli etc.

The following example is given to show the versatility of the new compound as a chemical intermediate.

EXAMPLE 6

Reaction with methylmercury (II) iodide

Methylmercury (II) iodide (1.83 g.) was added as a suspension in ether (10 ml.) to pentafluorophenylmagnesium chloride prepared by the above method from chloropentafluorobenzene (1.00 g.) in ether (15 ml.), and the mixture was heated under reflux for 3 hrs. Water (25 ml.) was added, the ether layer was separated and dried ($MgSO_4$), and then the ether was removed by vacuum transfer. Sublimation of the residue in a vacuum at room temperature gave methylpentafluorophenylmercury (0.95 g., 50%), which had an infra-red spectrum identical with that of the compound prepared previously. The compound has utility as a fungicide.

It should be understood that all temperatures as used herein are in degrees centigrade.

I claim:

1. A method of preparing substantially pure pentafluorophenyl magnesium chloride in high yield comprising reacting chloropentafluorobenzene with finely divided magnesium in a dry ether in the presence of ethylene dibromide.

2. A method of preparing substantially pure pentafluorophenyl magnesium chloride in high yield comprising the steps of: placing finely divided magnesium in diethyl ether; adding a minor proportion of ethylene dibromide; heating the mixture to activate the magnesium; and adding chloropentafluorobenzene to the heated mixture.

References Cited

UNITED STATES PATENTS

| 2,913,498 | 11/1959 | Ramsden | 260—606.5 |
| 3,075,018 | 1/1963 | Pummer et al. | 260—606.5 |
| 3,113,976 | 10/1963 | Buxton et al. | 260—650 |
| 3,250,795 | 5/1966 | Portrafke | 260—433 |

FOREIGN PATENTS 776,933  6/1957  Great Britain.

OTHER REFERENCES

Pearson et al., J. Org. Chem., vol. 34 (1959), pp. 504–508.

TOBIAS E. LEVOW, *Primary Examiner.*

A. P. DEMERS, *Assistant Examiner.*